G. G. HAYES.
CUSHION TIRE.
APPLICATION FILED MAR. 4, 1907.
940,460.
Patented Nov. 16, 1909.
3 SHEETS—SHEET 1.
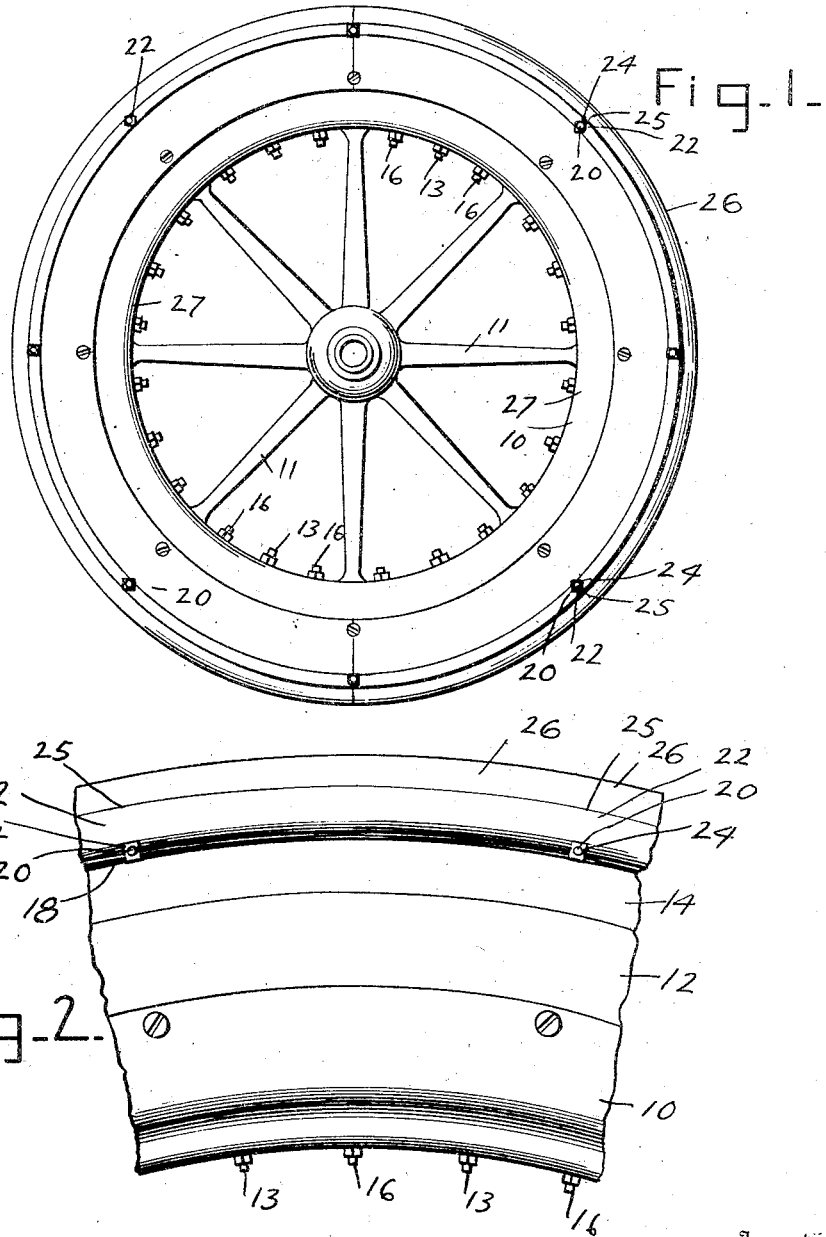

G. G. HAYES.
CUSHION TIRE.
APPLICATION FILED MAR. 4, 1907.

940,460.

Patented Nov. 16, 1909.

3 SHEETS—SHEET 2.

Witnesses
W. J. Rockwell
M. F. Miller

Inventor
Geo. G. Hayes
By Chandler & Chandler
Attorneys

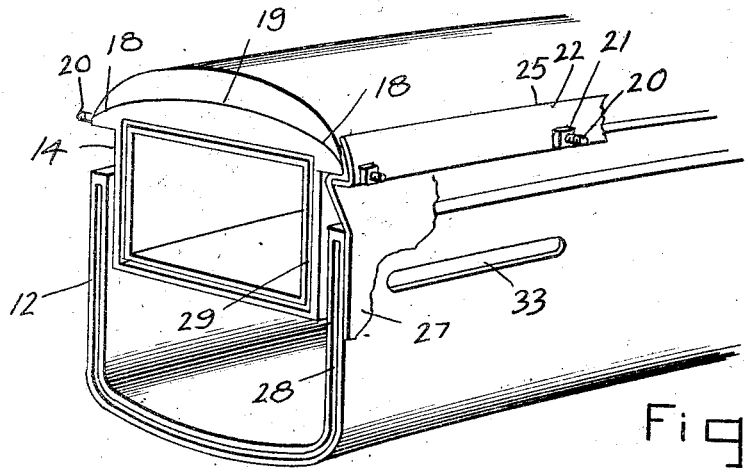
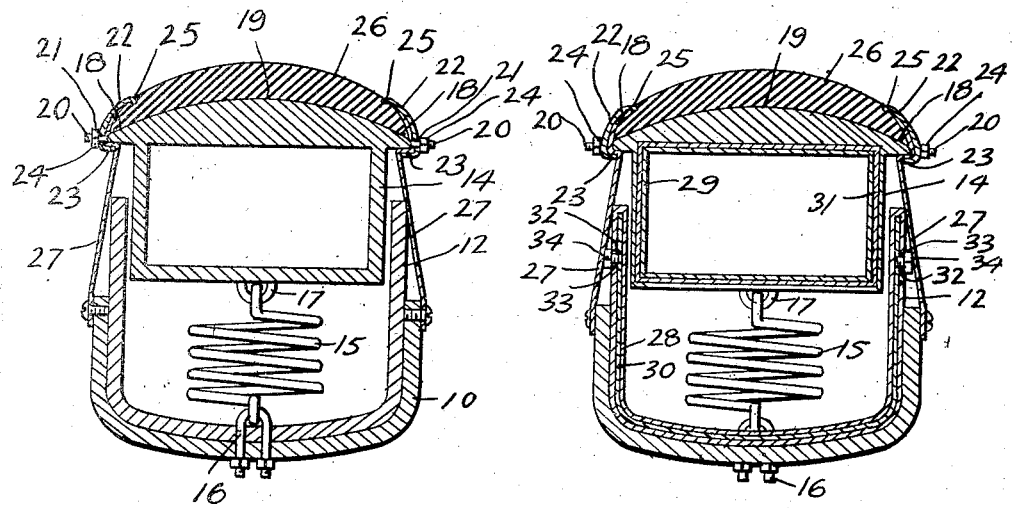

UNITED STATES PATENT OFFICE.

GEORGE G. HAYES, OF GLENWOOD SPRINGS, COLORADO.

CUSHION-TIRE.

940,460.

Specification of Letters Patent.   Patented Nov. 16, 1909.

Application filed March 4, 1907. Serial No. 360,383.

*To all whom it may concern:*

Be it known that I, GEORGE G. HAYES, a citizen of the United States, residing at Glenwood Springs, in the county of Garfield, State of Colorado, have invented certain new and useful Improvements in Cushion-Tires; and I do hereby declare the following to be a full, clear, and exact description of the invention, such as will enable others skilled in the art to which it appertains to make and use the same.

This invention relates to cushion tires and more particularly to that class in which a plurality of springs are interposed between a rim and a tread member surrounding the rim and the tire embodied in my invention involves a number of novel features which will hereinafter be fully explained.

One of the features of my invention resides in the fact that but a comparatively thin rubber tread is provided and this is so held upon the tread member of the tire that it may be quickly detached at any desired time and a new tread substituted. I also connect with the tread member, by means of the tread holding device, continuous leather flaps which are also secured to the rim of the tire thereby preventing dust or the like entering between the rim and the tread member and injuring the springs or in other ways interfering with their action. I also form the tire into semi-circular sections one end of one section, including both the rim and tread members, being slotted or recessed for the reception of one end of the other section which latter end is reduced for the purpose stated. It is to be understood however that by referring to the rim, I do not mean to indicate the rim of the wheel, which as a matter of fact is of usual construction, but a rim-like section of the tire and I will so designate this member of the tire throughout the specification and claims.

Figure 3:
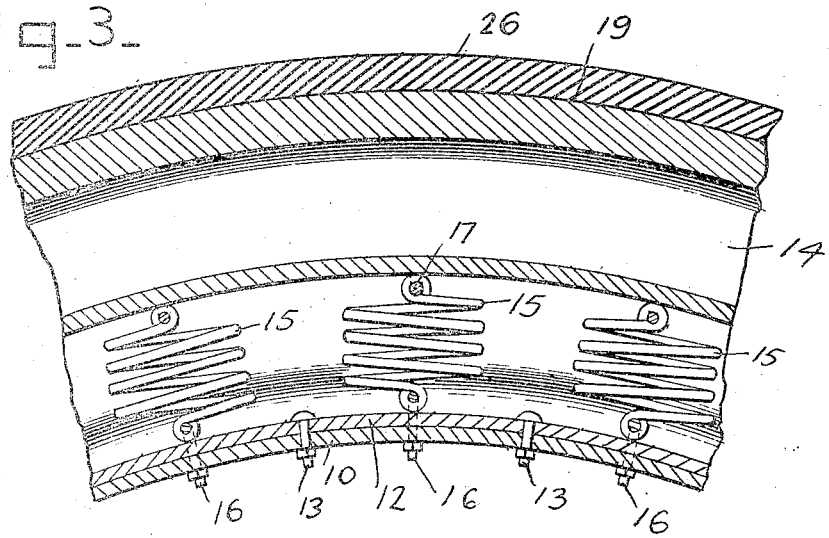
Figure 6:
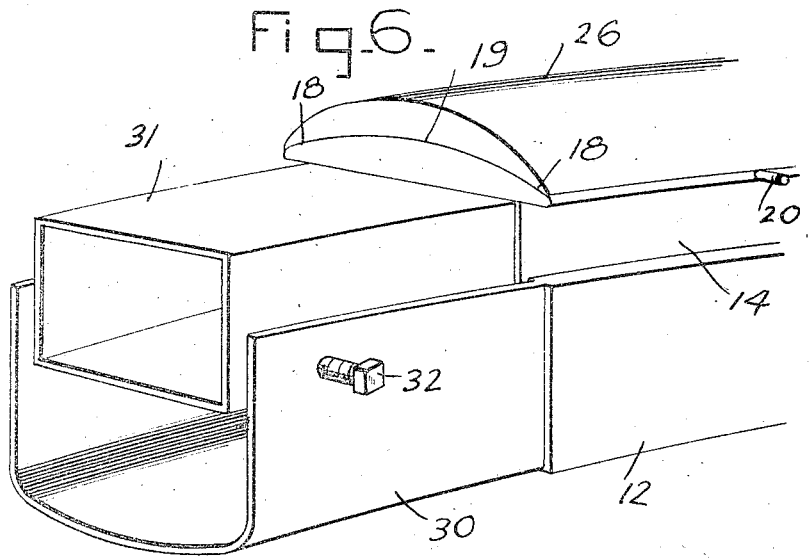

In the accompanying drawings, Figure 1 is a side elevation of a wheel employing a tire constructed in accordance with my invention, Fig. 2 is a similar view but showing the dust excluding flap removed, Fig. 3 is a detail vertical sectional view taken longitudinally of the tire, Fig. 4 is a detail vertical transverse sectional view taken about the middle of one of the tire sections, Fig. 5 is a view similar to Fig. 4 but taken at the point of junction of the section, Fig. 6 is a detail perspective view of one end of one section, and, Fig. 7 is a similar view of one end of the other section.

Referring more specifically to the drawings the rim of the wheel is indicated by the numeral 10 and the spokes by the numeral 11. The rim member of the tire is indicated by the numeral 12 and is curved transversely to form a contour of the wheel rim 10 and the edges of the rim 12 are extended a short distance above the edges of the wheel rim 10 for a purpose to be hereinafter clearly stated. This rim 12 is preferably made of sheet metal and is bolted to the wheel rim by means of bolts 13 as clearly shown in Fig. 3 of the drawings.

The tread member of my tire comprises an annular body 14 which is substantially rectangular in cross section and is hollow as clearly shown in the transverse sectional view of the drawings and this tread member is telescopically received in the rim 12 but is normally held against movement entirely into the rim by means of helical springs 15 which are interposed between the bottom of the rim and the under side of the tread member and these springs are of such number that they lie in close relation one to the other and they are secured to the rim 12 by means of U-bolts 16 which are engaged through the rims 12 and 10 and to the inner periphery of the tread member by means of suitable clips 17 which are formed integral therewith. It will be understood of course that the tendency of these springs normally force the tread member out from the rim at all times and at every point in the circumference of the tread member.

I have stated that the tread member is substantially rectangular in form but the edges of the member at its outer periphery are flanged as at 18 and the outer periphery is convexed transversely as at 19 and formed integral with the edges of the flanges 18 and at equidistant points thereon are threaded studs 20 which are designed to be entered through openings 21 formed at corresponding intervals in a band 22 which has a flange 23 adapted to fit snugly against the under side of the corresponding flange 18, the said bands being held securely upon the flanges by means of nuts 24 which are engaged upon the threaded studs 20 and bear against the bands. The body portion of each band is curved in a greater arc than the arc of curvature of the tread 19 and hence is positioned in spaced relation thereto, the edge of the body portion of each band being turned slightly inwardly toward the tread 19 as at 25 to firmly hold to the tread a rubber strip 26 which is concavo convexed in cross section and preferably thicker at its middle than at its edges.

Now in order to prevent the entrance of dust or other foreign matter between the rim 12 and the tread member of the tire, I have provided leather flaps 27 which are secured at one of their edges one to each side or flange of the tread member by having their edges engaged between the flanges and the bands 22 as clearly illustrated in the transverse sectional view in the drawings and at their other edges these flaps are riveted or otherwise secured to the rim 10.

In order that my tire may be readily applied to the wheels now in use, the tire is formed in a pair of semicircular sections one end of each section being reduced to fit within the opposite end of the other section in a manner which will now be described.

One end of each of the sections mentioned above or rather the rim 12 and the tread member 14 is slotted as at 28 and 29 respectively, the slot 28 being of the same configuration as the cross section of the rim 12 and the slot 29 being substantially rectangular. The other ends of the rim and tread members are reduced as indicated respectively by the numerals 30 and 31 and are adapted to be received in the slots 28 and 29 respectively in the first mentioned ends of the other sections of the tire and the tread 19 is omitted throughout the reduced ends of the section.

Formed in the sides of the reduced end portions of the rim are threaded openings into which are screwed bolts 32 which project through slots 33 formed in the outer wall of the slotted end portion of the rim and these bolts are provided with heads 34 which, when the tire sections have been properly bolted to the rim of the wheel and have hence had their ends brought tightly together, are tightened.

What is claimed is—

1. A tire of the class described comprising a pair of sections and including a rim and a tread member, one end of the rim and tread member of each section being slotted for the reception of the other end of the rim and tread member respectively of the other section.

2. A tire of the class described comprising a pair of sections and including a rim and a tread member, one end of the rim and tread member of each section being slotted for the reception of the other end of the rim and tread member respectively of the other section, the latter ends being reduced.

3. A tire of the class described comprising a pair of sections and including a rim and a tread member, one end of the rim and tread member of each section being slotted for the reception of the other end of the rim and tread member respectively of the other section, and means for holding the ends of the tire sections.

4. A tire of the class described comprising a pair of sections and including a rim and a tread member, one end of the rim and tread member of each section being slotted for the reception of the other end of the rim and tread member respectively of the other section, and adjustable means for holding the ends of the tire sections.

5. A tire of the class described comprising a pair of sections each including a rim and a tread member, one of the rim and tread members of each section being slotted, the other ends of the sections being reduced and received in the slots, the slotted ends of each section being provided in each side with a slot, and bolts passing through the last mentioned slots and into the connecting section to hold the tire sections in adjustment.

In testimony whereof, I affix my signature, in presence of two witnesses.

GEORGE G. HAYES

Witnesses:
J. B. HAYES,
J. W. ZIMMERMAN.